United States Patent [19]

Southwick

[11] Patent Number: 5,294,155
[45] Date of Patent: Mar. 15, 1994

[54] CORED HOLE WATERPROOFING APPARATUS

[76] Inventor: Robert Southwick, 2563 Oakley Dr., Pennsauken, N.J. 08109

[21] Appl. No.: 910,218

[22] Filed: Jul. 9, 1992

[51] Int. Cl.⁵ .............................. F16L 3/00; F16L 5/00
[52] U.S. Cl. ....................................... 285/64; 285/158; 285/192
[58] Field of Search ................. 285/64, 158, 192, 53; 248/56

[56] References Cited

U.S. PATENT DOCUMENTS

| | | | |
|---|---|---|---|
| 687,556 | 11/1901 | Carter | 285/192 |
| 5,076,309 | 12/1991 | Cornwall | 285/64 |

Primary Examiner—Paula A. Bradley
Assistant Examiner—Jeffrey T. Knapp
Attorney, Agent, or Firm—Norman E. Lehrer

[57] ABSTRACT

A waterproofing apparatus for sealing cored holes from water while supporting the riser clamp and weight of the riser. The apparatus is comprised of a cylindrically shaped sleeve constructed preferably from plastic having a body and a sealing flange and cylindrically shaped support ring constructed preferably from metal. The sleeve is elongated with the sealing flange located towards the center of the body. The body of the sleeve fits into the cored hole such that the flange rests upon the flooring through which the hole was cored and the upper end of the body extends above the flooring. The support ring fits over the outside diameter of the sleeve such that the ring rests on the flange member and extends above the upper end of the sleeve. Upon installation, the riser clamp is placed on the riser such that the riser's weight forces the clamp against the upper end of the support ring and supports the riser. The steel construction of the ring allows it to support the heavy weight of the riser in lieu of the plastic sleeve.

12 Claims, 1 Drawing Sheet

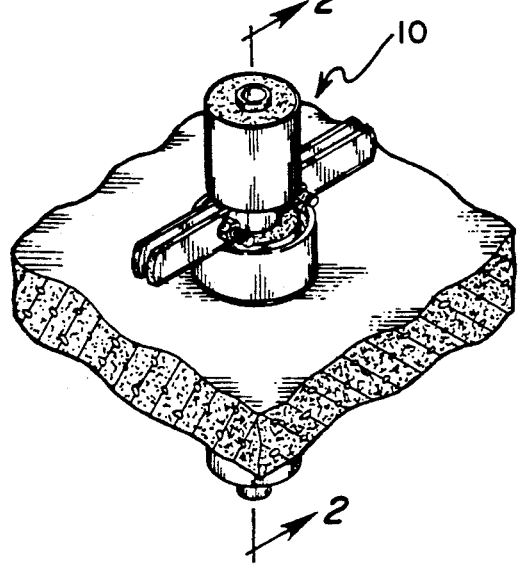
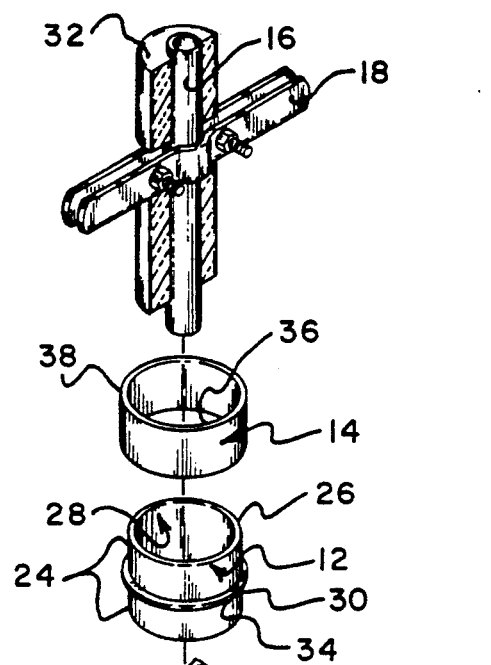
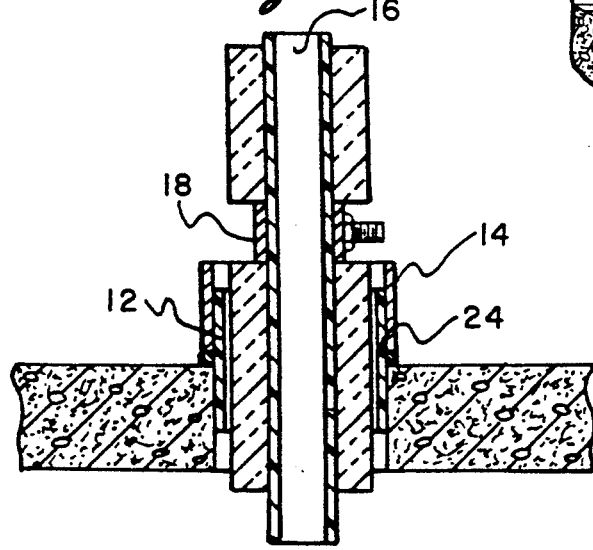
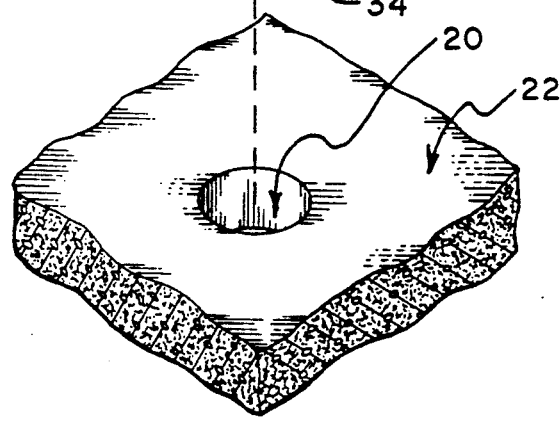

CORED HOLE WATERPROOFING APPARATUS

BACKGROUND OF THE INVENTION

This invention relates to a waterproofing apparatus for sealing a cored hole in flooring from water infiltration. The need for such an invention arises from the use of risers, conduit, or the like in the construction of buildings. The risers and the like are extended vertically through numerous stories of building through holes cored into the flooring for reasons such as guiding wire or moving water.

The risers, due to their length, require guidance, and due to their material of construction and content have significant weight. Accordingly, the risers require support for relieving the riser's joints and connections from the load. Additionally, there exists a need to waterproof the holes such that water will not enter the hole and travel down to the underlying floor and inhabitants. Riser clamps are used to support the risers and provide guidance but are not in themselves susceptible to waterproofing the cored holes. Several devices have been proposed in the past having more expensive designs and greater difficulty of use than the instant invention.

U.S. Pat. No. 1,210,217 to Schodde, for example, discloses a pipe-sleeve used for waterproofing holes in flooring through which piping passes. The Schodde invention uses a sleeve through which the piping passes wherein the sleeve must be embedded in the concrete floor. Upon setting of the concrete, a seal for preventing water or gas or the like from entering the hole is developed. The Schodde invention has several forms all of which are more complicated to manufacture than the instant invention. Most significantly, the installation of the Schodde sleeve is complicated and time consuming requiring embedment into the concrete floor. Upon insertion, the sleeve must be held in place via outside means until the concrete is hardened. The instant invention is installed after the floor is completed, the hole is cored and the riser is run through. This device is installed by simple insertion of the riser into the sleeve and the sleeve into the hole.

U.S. Pat. No. 4,433,860 to Lindquist discloses a sleeve for waterproofing holes formed through roofing in which piping passes. The construction of the Lindquist invention is of a relatively complex nature requiring machining and welding whereas the instant invention is constructed from stock materials and a molding process. Additionally, it does not incorporate the use of a separate support ring for directing the weight of a riser via the riser clamp towards the sealing area while protecting the main body of the sleeve. The Lindquist invention does not use the riser to help form the seal, it incorporates separate clamping means to establish the seal.

SUMMARY OF THE INVENTION

The present invention enables ease of manufacture of a water proofing device while enabling a user to effectively and easily seal a cored hole from water. The sealing portion of the apparatus is formed preferably from plastic thereby allowing a molding type process to service a variety of hole sizes. The riser supporting portion of the invention is formed from a stronger material, preferably metal, which can be constructed from stock tubing. The invention is simple to us and installed after the flooring is laid and the hole is cored, unlike many previous devices.

In accordance with the invention, the apparatus described comprises an elongated, cylindrically shaped sleeve for insertion into as well as extension out of a cored hole; and a cylindrically shaped support ring which fits over the sleeve and supports the riser clamp in lieu of the sleeve by extending above the sleeve's upper end. The sleeve portion comprises a body, cylindrically shaped, and a flange located towards the center of the body. The body fits into the cored hole while the flange has a diameter larger than the cored hole so as to prevent the body from slipping through the hole. The body extends upward from the top side of the flange. The riser runs through the center of the sleeve.

The support ring fits around the body and rests on the upper surface of the flange when installed. The ring has a height extending above the height of the body. This further extension allows the ring to support the full load of the riser and riser clamp as the riser clamp attaches to the riser and rests on the upper end of the support ring to relieve the weight of the riser. The supported weight forces the support ring down upon the flange establishing a seal between the flange and the flooring. A gasket, sealant, or an "O" ring can be used to assist the formation of a water tight seal.

The result is an easily installed and easily manufactured cored hole water proofing apparatus capable of accommodating a variety of different size holes at low cost and minimal labor.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a perspective view of the cored hole waterproofing apparatus, as installed, including the sleeve and support ring; and FIG. 2 is a cross sectional view taken along line 2—2 of FIG. 1; and FIG. 3 is a perspective view of the individual parts of the apparatus indicating the manner of its assembly, utilizing a riser, riser clamp and cored hole.

DETAILED DESCRIPTION OF THE PREFERRED EMBODIMENT

Referring now to the drawings in detail wherein like reference numerals have been used throughout the various figures to designate like elements there is shown in FIG. 1 a perspective view of the assembled cored hole waterproofing apparatus constructed in accordance with the general principles of the present invention and designated generally as 10. The waterproofing apparatus 10 is comprised of the sleeve 12 and the support ring 14. The apparatus 10 functions in combination with the riser 16, the riser clamp 18, and a cored hole 20 formed through the flooring 22.

The sleeve 12 is inserted into the cored hole 20 through which the riser 16 passes. The support ring 14 is placed over the sleeve 12 and the riser clamp 18 rests on the support ring 14.

Referring now to FIGS. 2 and 3 for further detail of the sleeve 12, as shown in FIG. 3, the sleeve is elongated and cylindrically shaped and preferably formed from plastic. The sleeve 12 comprises a body 24, with an outside diameter 26, an inside diameter 28 and a sealing flange 30. The outside diameter 26 of the body 24 is substantially the same diameter as the cored hole 20 and fits inside the cored hole. The inside diameter 28 of the body 24 is sufficient in size for fitting the riser 16 and the optional insulating material 32.

FIG. 3 shows how the flange 30 extends horizontally outward from the periphery of the body 24 and is connected thereto. The flange 30 is located adjacent to the vertical centerline of the sleeve 12 toward the upper end of the sleeve 12. The flange 30 has an outer diameter 34 larger than the outer diameter of the body 12 and the hole 20. The lower edge of the flange rests on the flooring 22 for supporting the sleeve 12 in the cored hole 20.

Referring still to FIGS. 2 and 3, the support ring 14 is cylindrically shaped and is generally constructed from metal. The support ring 14 has an inside diameter 36 that is slightly larger than the outside diameter 26 of the body 24 so that the support ring 14 fits around the body 24 of the sleeve 12. The outside diameter 38 of the support ring 14 is approximately equivalent to the outside diameter 34 of the flange 30. The support ring 14 is installed over the sleeve 12 such that the lower end rests against the upper side of the flange 30 as shown in FIGS. 1 and 2. While installed, the height of the support ring 14 is such that it extends above the upper end of the sleeve 12 as shown in FIG. 2. The function of this feature is to support the weight of the riser and riser clamp such that the body portion 24 of the sleeve 12 is relieved of this task.

The method for installing and using the water proofing apparatus will now be described. The apparatus may be used with risers such as piping of any kind and conduit as well as other similar applications. For ease of description, the word "risers" will be understood to mean piping or conduit of any kind that runs vertically and that may be part of a plumbing or heating system or contain electrical wires or the like. The hole 20 is first cored in the flooring through which the riser will pass. Before the riser 16 is placed through the cored hole 20, the apparatus 10 should be installed. Depending upon the size of the riser and accordingly, the size of the hole, a proper size sleeve 12 is selected with an outside diameter 26 slightly smaller than the hole 20 diameter. Prior to inserting the sleeve 12, an "O" ring, sealant, gasket, or something similar can be placed between the flange and flooring to facilitate establishing the water tight seal between the lower surface of the flange and the flooring. The sleeve 12 is then placed in the hole such that the flange 30 rests flatly a the flooring 22. The support ring 14 is placed over the upper end of the body 24 of the sleeve 12. The lower end of the support ring 14 should rest flatly on the exposed upper side of the flange 30. The support ring 14 will extend up above the upper end of the sleeve 12 for supporting the weight of the riser 16 via the riser clamp 18.

The riser 16 with the optional insulation 32 may now be passed through the cored hole 20, and sleeve 12 and support ring 14 as assembled. The riser clamp 18 is now assembled on the riser 16. The riser clamp 18 is positioned on the riser 16, against the upper end of the support ring 14, and tightened thereon such that the weight of the riser is supported by the support ring 14.

What is claimed is:

1. In a waterproofing system for waterproofing a cored hole formed through flooring through which a riser passes, comprising:

(a) a substantially cylindrically shaped and substantially vertically extending sleeve, said sleeve comprised of a body portion and a sealing flange, said body portion having an outside diameter slightly smaller than the diameter of said cored hole and adapted for fitting in said cored hole and extending above said flooring, said sealing flange being connected to said body portion, said sealing flange extending horizontally outward from the periphery of said body portion and having an outside diameter larger than said outside diameter of said body portion and larger than the diameter of said hole, said sealing flange being adapted for placement against said flooring for sealing of said cored hole from water; and (b) a substantially cylindrically shaped support ring for supporting the weight of a riser, said ring being constructed from a material which is more durable than said sleeve and having an inside diameter slightly larger than said outside diameter of said body portion and being adapted for placement around said body portion, said inside diameter of said ring being smaller than said outside diameter of said sealing flange, the lower end of said support ring being adapted for engagement with said sealing flange and the upper end of said support ring extending above the upper end of said sleeve, said support ring being formed from a material capable of withstanding the weight of said riser.

2. The invention according to claim 1 wherein said sleeve is formed from plastic.

3. The invention according to claim 2 wherein said support ring is formed from metal.

4. The invention according to claim 3 wherein said flange is integrally attached to said body portion.

5. The invention according to claim 3 wherein said flange is constructed separately from said body portion of said sleeve and secured to said body portion.

6. In a waterproofing system for sealing a cored hole formed through a building floor through which a riser passes, a cylindrically shaped sleeve having a body portion adapted for extending within said hole and having an upper end extending above said floor, said body portion having an outside diameter and an inside diameter; a riser clamp located above said sleeve and attached to said riser for supporting said riser, wherein the improvement comprises:

(a) said sleeve having a horizontally extending sealing flange connected thereto, said sealing flange extending outwardly from the periphery of said body portion of said sleeve, said sealing flange having an outside diameter larger than said outside diameter of said body portion, said sealing flange adapted for overlying and being in contact with said floor for sealing of said hole from water; and (b) a substantially cylindrically shaped support ring for supporting said riser clamp, said ring having a lower end and an upper end and being formed from a material capable of withstanding the weight of said riser, said support ring having an inside diameter larger than said outside diameter of said body portion of said sleeve and adapted for placement around said body portion, said inside diameter of said support ring being smaller than said outside diameter of said sealing flange, the lower end of said support ring being adapted for engaging said sealing flange, the upper end of said support ring extending above the upper end of said sleeve.

7. The invention according to claim 6 wherein said outside diameter of said body portion of said sleeve is slightly smaller than the diameter of said hole, said inside diameter of said ring is slightly larger than said outside diameter of said body portion, said diameter of said flange is larger than the diameter of said hole.

8. The invention according to claim 7 wherein said ring is constructed from a material more durable than said sleeve.

9. The invention according to claim 8 wherein said sleeve is formed from plastic.

10. The invention according to claim 9 wherein said support ring is formed from steel.

11. The invention according to claim 10 wherein said flange is integrally attached to said body portion.

12. The invention according to claim 10 wherein said flange is constructed separately from said body portion of said sleeve and secured to said body portion.

* * * * *